US008190581B2

(12) United States Patent
Loman et al.

(10) Patent No.: US 8,190,581 B2
(45) Date of Patent: May 29, 2012

(54) REAL-TIME CONTENT DETECTION IN ISP TRANSMISSIONS

(75) Inventors: James M. Loman, Dallas, TX (US); Alexandre Gerber, Madison, NJ (US); Oliver Spatscheck, Randolph, NJ (US); Ajay Todimala, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 327 days.

(21) Appl. No.: 12/315,380

(22) Filed: Dec. 3, 2008

(65) Prior Publication Data

US 2010/0138543 A1  Jun. 3, 2010

(51) Int. Cl.
*G06F 17/00* (2006.01)
(52) U.S. Cl. .................................. 707/685; 707/705
(58) Field of Classification Search .............. 707/687, 707/705, 685
See application file for complete search history.

(56) References Cited

U.S. PATENT DOCUMENTS

| | | | |
|---|---|---|---|
| 5,875,175 A * | 2/1999 | Sherer et al. | 370/230 |
| 6,006,269 A * | 12/1999 | Phaal | 709/227 |
| 6,658,423 B1 | 12/2003 | Pugh et al. | |
| 7,149,788 B1 * | 12/2006 | Gundla et al. | 709/218 |
| 7,165,100 B2 | 1/2007 | Cranor et al. | |
| 7,840,178 B2 * | 11/2010 | Hellman | 455/3.02 |
| 7,853,664 B1 * | 12/2010 | Wang et al. | 709/217 |
| 7,861,312 B2 * | 12/2010 | Lee et al. | 726/27 |
| 2006/0229124 A1 * | 10/2006 | Walker et al. | 463/20 |
| 2006/0229125 A1 * | 10/2006 | Walker et al. | 463/20 |
| 2006/0232004 A1 * | 10/2006 | Walker et al. | 273/138.1 |
| 2006/0259318 A1 * | 11/2006 | Walker et al. | 705/1 |
| 2007/0094408 A1 * | 4/2007 | Gundla et al. | 709/231 |

OTHER PUBLICATIONS

S. Brin, J. Davis, H. Garcia-Molina, "Copy Detection Mechanism for Digital Documents" Dept of Computer Science, Stanford Univ. , Proceedings of the ACM SIGNOD Annual Conference, San Jose, ACM SIGMOD Record vol. 24, iss. 2, May 1995.
Vobile, Inc, "TVU and Vobile Announce First Commercial Deployment of Digital Fingerprinting for Live Event Producers and Content Owners" Reuters, Press Release May 19, 2008.
Vobile, Inc, "NAB 2008: Vobile Launches VideoDNA Live; Enables Real-Time Digital Content Protection for Live Broadcast Events" Techshowwire, Press Release Apr. 16, 2008.

(Continued)

*Primary Examiner* — Mohammad Ali
*Assistant Examiner* — John Hocker (57) ABSTRACT

A method and system for detecting the transmission of preidentified content, such as copyrighted material, over an Internet Service Provider (ISP) network. A set of rules is provided to identify one or more traffic flow profiles of data streams transmitting preidentified content. Preferably the rules are adaptively created through analysis of actual ISP data in conjunction with data suggesting an initial set of profile characteristics. The rules are applied to data streams being transmitted in the ISP network, so that data streams fitting one or more of the profiles are identified. A database contains, e.g., as digital signatures or fingerprints, one or more items of content whose transmission is sought to be detected. Data streams identified as matching a profile are analyzed to determine if their content matches an item of content in the database, and if so, an action is taken which may include interrupting the transmission, suspending an ISP account, or reporting the transmission. An ISP with a system performing this method may offer services to content providers, and a plurality of ISPs may jointly use a single database of preidentified content to be compared to each ISP's identified data streams.

22 Claims, 4 Drawing Sheets

OTHER PUBLICATIONS

C. Cranor, T. Johnson, O. Spatscheck, and V. Shkapenyuk. "Gigascope: High Performance Network Monitoring With an SQL Interface", in Proc. ACM SIGMOD Int. Conf. on Management of Data, pp. 647-651, 2003.

M. Thottan and C. Ji, "Anomaly Detection in IP Networks", IEEE Transactions on Signal Processing, vol. 51, No. 8, pp. 2191-2203, Aug. 2003.

L. Lewis and G. Dreo, "Extending trouble ticket systems to fault diagnosis", IEEE Network, vol. 7, pp. 44-51, Nov. 1993.

A. Lakhina, M. Crovella and C. Diot, "Characterization of Network-Wide Anomalies in Traffic Flows", IMC '04, Oct. 25-27, 2004, Taormina, Sicily, Italy.

A. Lakhina, M. Crovella and C. Diot, "Diagnosing Network-Wide Traffic Anomalies", SIGCOMM '04, Aug. 30-Sep. 3, 2004, Portland, Oregon, USA.

* cited by examiner

REAL-TIME CONTENT DETECTION IN ISP TRANSMISSIONS

FIELD OF THE INVENTION

The present invention generally relates to network management of ISP (Internet Service Provider) networks, and more particularly to a method and system for detecting transmission of specific content over the network, such as the transmission of pirated copyrighted materials.

BACKGROUND OF THE INVENTION

A recurring problem in Internet usage is the transmission of unauthorized content. One very commercially important example of this problem relates to copyrighted materials. Copyrighted text, music and movies can be transmitted rapidly and cheaply over the Internet, allowing Internet users to easily obtain unauthorized or pirated copies to the detriment of copyright owners. Policing such unauthorized transmission is difficult for copyright owners, because the sources of copyrighted materials may be elusive, or indeed may be legitimate possessors of copyrighted materials but do not have authorization to permit copies to be made. Pursuing the illegal distributors of such materials is problematic because the users are often numerous and diffuse and individual legal action against multiple small users is expensive—as well as unsympathetic from a public relations standpoint when the users turn out to be teenagers or others whose motives are seldom to make a criminal profit.

Approaches to this problem at the source have included attempts to integrate copy-protection measures in the copyrighted materials, but these attempts have met with marginal success as hackers develop—and publish—countermeasures.

A second approach to dealing with the problem at its source is to try to identify Web sites and/or distribution networks/tools that contain copyrighted materials. For example, a form of structural comparison to detect copyright infringement is disclosed in Sergey Brin, James Davis and Hector Garcia-Molina, "*Copy Detection Mechanisms for Digital Documents,*" Proceedings of the ACM SIGMOD Annual Conference, San Jose 1995 (May 1995). An available version of the paper can be found at http://dbpubs.stanford.edu:8090/pub/showDoc.Fulltext?lang=en&doc=1995-43&format=pdf&compression=&name=1995-43.pdf. This paper discloses a method which determines whether an identified document is a copy of a specific preidentified copyrighted article. As described in the paper "the service will detect not just exact copies, but also documents that overlap in significant ways." However, the method requires that the document to be tested be available to start with, would seem to require every data transmission to be tested, and thus does not lend itself to real-time application on Web traffic being transmitted at the high data traffic rates of a typical ISP.

In another example, U.S. Pat. No. 6,658,423 to Pugh et al. discloses duplicate and near-duplicate detection techniques for operating a search engine which assign a number of fingerprints to a given document by extracting parts from the document, assigning the extracted parts to one or more of a predetermined number of lists, and generating a fingerprint from each of the populated lists. Two documents are considered to be near-duplicates if any one of their fingerprints matches. This technique is used to find mirrored Web sites, which either are identical to hosts or are "near-duplicate" copies with insignificant content differences from the host. However, the technique would not be a practical solution for locating illicit content transmitted over an ISP network, first, because it involves the work of completely crawling the Web (a process which is neither economical nor quick) to look for near-replicas of specific pages or portions of a Web site.

These approaches have the drawback that they either require both the copyrighted work and the suspected copy to be already available (Brin article) or they require web-crawling of the entire Web content to locate duplicates or near duplicates (Pugh patent). In addition, they do not deal with the majority of today's distribution of copyright infringement that occurs over Peer to Peer (P2P networks.

An approach which attempts to deal with the problem at the destination is to limit access to or block sites having copyrighted content. These approaches are problematic because the sites are often located outside of the US where copyright laws are not easily enforceable. In addition, techniques to block or limit access by US-based consumers can be thwarted either by the consumer or by the end site providing the content.

Other approaches have attempted to detect the Internet transmission of copyrighted material. These approaches require the participation of those managing transmission resources, such as ISPs, and have included deep packet inspection tools to look for specific protocol types or specific files. Other specialized network appliances have been used to investigate the payload of an IP packet to check for copyright infringement such as the comparing service VideoTracker™ offered by Vobile, Inc. of Santa Clara, Calif. While these approaches eliminate many of the drawbacks associated with the source and destination approaches listed above, the combination of vast amounts of content transmitted over the Internet, and high transmission speeds, require these prior art transmission inspection techniques to employ too many resources—both software and hardware—to cope with existing traffic throughput, and accordingly none of these prior art techniques can perform this detection function in a cost effective and timely manner. These prior art techniques have the further drawback that they require a detailed examination of transmissions of all customers—whether or not there is probable cause to believe they are infringing—which implicates issues of customer privacy.

While the detection of pirated copyrighted materials is an example that has high commercial visibility, there are other transmissions of content that are of interest. For example, law enforcement officials are interested in detecting the transmission of illicit content in the form of child pornography. As another example, national security officials, when permitted by governing law, may be interested in detecting the transmission of certain forms of content, such as that relating to bomb or weapons construction.

Accordingly, there remains a need for methods and systems capable of detecting the transmission of specific content, such as copyrighted content, over the Internet in a timely and cost effective manner while still preserving customer privacy.

Additionally, there remains a need for methods and systems which allow an ISP to offer a service to clients, such as copyright owners, to detect the transmission of content of interest, such as copyrighted content, over the ISP's network.

BRIEF SUMMARY OF THE INVENTION

The present invention provides a method and system which are able to detect the transmission of content of interest, such as copyrighted content, which are able to operate in real time in a cost effective manner, which preserve customer privacy, and which make advantageous use of current technologies.

The present invention preferably uses a currently available real-time network data management device which is capable of analyzing the complete flow of data packets in a data stream. An example of such an existing device is the AT&T Gigascope data analyzer.

The method according to the invention proceeds by providing a set of rules to identify the traffic flow profile of illicit content, or the profile of a repeat or recidivistic copier of illicit content, such as a pirate of online copyrighted material. Such rules may be provided by observation or research relating to profile characteristics.

In one preferred embodiment of the invention, such rules are provided by adaptive rule making techniques. Using such techniques, rules are provided by collecting data regarding the traffic flows within the ISP broadband network, and using a device such as the Gigascope data analyzer to process the collected data in conjunction with other source data from related research suggesting profile characteristics. For example, adaptive rule making might proceed by positing an initial profile characteristic, assuming a data correlation to the characteristic, processing data to look for instances of the characteristic, testing the found instances to determine if the data possesses the profile characteristic, measuring a deviation, and modifying the characteristic and correlation to data to reduce the deviation and improve the match. As an illustrative example, it might be posited that movie copying correlates to a rule which identifies single user download times of more than an hour. Actual data analysis might adapt the rule to a better one that identifies download times of 30 minutes from a single site of certain file types associated with movies (e.g., mpeg files). Adaptive rule making permits the rules to get better with experience and follow changes in usage, as providers or users change patterns to escape detection.

The identification rules that are developed by adaptive rule making or otherwise are selected to have the characteristic that they can be applied to high speed data streams with a high speed data analysis tool such as the AT&T Gigascope analyzer, i.e., they involve relatively few tests, and tests that are able to be performed by analysis of streams of packets transmitted at high speeds. They also are selected to be effective in confirming the existence of a suspected data flow because the usage profiles they represent correlate well in reality with the existence of problematic content. In this sense, the identification rules perform as a set of real-time filters on the entirety of the data flow to identify those subsets of the data flow which are worth examining in further detail using slower but more thorough and exact tests for locating illicit content.

The identification rules that are developed by adaptive rule making or otherwise are applied to on-line data streams in the ISP network so that data streams that fit the profile are identified. In an embodiment of the invention, the identification rules are applied in an active, in-line deep packet inspection embedded within an ISP network element such as a core or gateway router.

Data streams that are so identified by the identification rules are then analyzed to determine if the content of the identified data streams matches the content of a database of preselected content, e.g., a database of copyrighted materials. In an embodiment of the invention the analyzing and matching steps are performed by a commercially available specialized digital fingerprinting device which stores digital fingerprints of items of preselected content, such as copyrighted materials, and compares them with digital fingerprints of the identified data streams.

If the content of the identified data stream is a positive match with a database item, e.g., is a copyright infringement, then a responsive action is taken. The responsive action, for example, might be to terminate the data transmission, to suspend the customer's account, or to report the existence of the match to an interested party, such as a copyright owner or a law enforcement or security official, or to store the positive match to compare to later matches that are detected in subsequent transmissions to the same user or from the same sender.

The system according to the invention comprises means for performing the method described above, i.e., means for storing a set of rules (for example, rules created by adaptive rule making) to identify the traffic flow profile of illicit content or of a repeat or recidivistic copier of illicit content, means for applying the rules to on-line data streams in the ISP network to identify data streams that fit the profile, means for analyzing the content of the identified data streams to determine if that content matches the content of a database of preselected content, e.g., a database of copyrighted materials, and means for taking an action in response if a positive match is found. The various means described in functional terms are, in specific embodiments of the invention, analytical devices such as the Gigascope processor, inspection devices embedded in ISP network elements such as core or gateway routers, and specialized digital fingerprinting devices.

The present invention thus can be seen to have many advantages: it is capable of identifying likely incidents of illicit content transmission, such as piracy of copyrighted material, confirming the presence of such content, and then taking action while preserving the privacy of those ISP customers who have no association with copyright infringement. Further, the present invention is able to achieve these advantages in a deployment that is economically and technically feasible, making use of existing network devices and not requiring extensive hardware or software development. The development of profile rules to identify instances of content abuse permits the method to be used on-line to monitor heavy ISP data traffic and to select the relatively small number of data streams that are problematic and deserve further analysis, which can then be performed using existing slower speed digital fingerprinting or computed hash value comparison devices that would be incapable by themselves of handling an ISP's vast amount of throughput.

The arrangement of the present invention lends itself as well to certain kinds of shared usage. For example, more than one ISP could share a single digital fingerprinting device to analyze identified data streams for matches with a single database of copyrighted materials, which would make it easier for copyright owners to register their content as by registering it just once with a central repository and not with each separate ISP.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
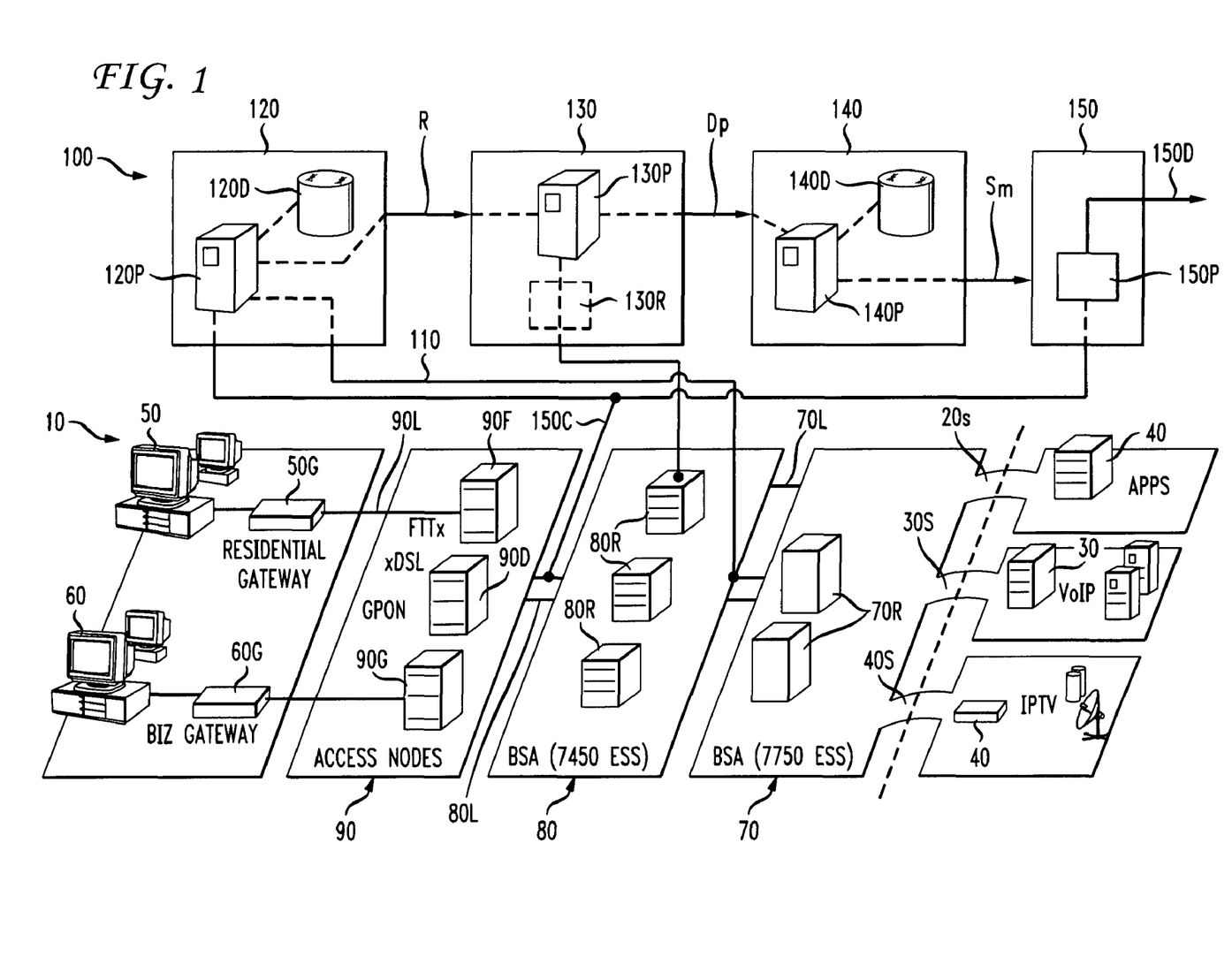
FIG. 1 is a diagram showing an example of ISP network elements together with an illustrative system according to the invention.

FIG. 1 shows an illustrative ISP broadband network 10 operated by an Internet Service Provider (ISP). The ISP network 10 receives data streams 20S, 30S and 40S from various Internet sources, illustratively shown as applications services devices 20, VoIP telephony services devices 30, and IPTV video services devices 40. The ISP network 10 delivers data from devices 20, 30 and 40 to residential users 50 and business users 60 connected respectively to residential gateway 50G and business gateway 60G.

As shown in FIG. 1, network 10 typically includes an aggregation layer or region 70 containing aggregation or edge routers 70R, which may be, for example, 7750 SR routers provided by Alcatel Lucent (ALU). The aggregation routers transmit data over links 70L to local layer 80 containing distribution switches 80R, which may be, for example, 7450 ESS routers provided by ALU. Data then proceeds over links 80L to access nodes 90, illustratively shown as an FTTx access node 90F, an xDSL access node 90D, or a GPON access node 90G. The access nodes in turn send data over links 90L to gateways 50G, 60G. The links 70L and 80L may be, for example, well known transmission links (e.g., fiber optic links), and are selected to have the capacity to handle the volume, QoS and delay constraints for anticipated traffic over network 10, using design and traffic engineering criteria known by those of skill in the art.

The problem addressed by the present invention is that the data carried by ISP network 10 via routers 70R, 80R and links 70L, 80L may include preidentified content that is problematic in one way or another—it is copyrighted content being transmitted in violation of copyright rights, or it is pornographic content being transmitted in violation of pornography laws, or it is other content whose detection is of interest. It is desirable for the ISP to have the ability to detect the presence of such content as it is being transmitted over the network 10 and to take an appropriate responsive action.

Accordingly, the ISP network 10 has a content detection system 100 in accordance with the present invention. For illustrative purposes in FIG. 1, the content detection system 100 is shown as removed from the remainder of network 10, but in practice significant aspects of it will advantageously be integrated into preexisting network elements in a manner to be described below.

As shown in FIG. 1, content detection system 100 includes a rule-supplying device 120, which supplies network-layer profile rules R for identifying network-layer traffic that has a significant likelihood of correlating with one or more types of problematic application-layer content. Alternatively, the profile rules R may be designed to identify network-layer traffic the correlates with repeat or recidivistic transmission or receipt of problematic content. In a preferred embodiment to be described below, rule-supplying device 120 is a data analyzer receiving data transmissions over a fiber tap 110 from link 70L and is arranged to adaptively generate the profile rules R using adaptive rule making techniques.

Profile rules R provided by data device 120 are sent to a rule-comparing device 130, which applies the network-layer rules in a real-time application to high-speed streams of data being transmitted by the ISP network 10, and identifies those streams Dp which conform to the profile rules.

As shown in FIG. 1, in one embodiment configured to test the workability of the system, the rule-comparing device 130 comprises a mirrored network router 130R, a duplicate of and connected to router 80R, supplying a mirror copy of data streams in the network 10, and a processor 130P which analyzes those mirrored data streams to determine if any of them satisfy the profile rules R. In normal usage, the router 130R will not be mirrored but will simply be a router 80R and the processing of rule-comparing device 130 will take place directly within router 80R. The streams Dp that satisfy the profile rules R and are identified by rule-comparing device 130 are delivered to a known content-matching device 140. The identified data streams Dp will be a small subset of all the streams of data being transmitted, which means (a) that most traffic is unaffected, and (b) the identified data streams Dp can be provided at rates manageable by the processing operations of content-matching device 140.

Content-matching device 140 includes a processor 140P which analyzes the identified data streams Dp to determine if they contain any of the preidentified content in a content database 140D. Content-comparing device 140 preferably is one that uses processor 140P to reconstruct identified streams Dp and compare the content of the those streams with digital fingerprints and/or computed hash values of content stored in content database 140D. The output of content-comparing device 140 is a signal Sm which indicates whether the content of the identified stream Dp, which has been analyzed by processor 140D, has produced a positive match or not. Content-comparing device 140 may be a device such as the digital fingerprinting devices of Vobile, Inc. of Santa Clara, Calif.

If content-comparing device 140 produces a positive match, i.e., determines that the identified data stream Dp contains preidentified content, then the signal Sm is sent to a response unit 150, with a processor 150P, to cause one or more responsive actions to be taken. The responsive action, for example, might be to terminate the data transmission by means of a connection 150C to network 10, to suspend the customer's account, or to report via another connection 150D the existence of the match to an interested party, such as a copyright owner or a law enforcement or security official. An additional responsive action, in a preferred embodiment of the invention, is to supply the signal Sm via another connection 150E back to the rule-providing device 120. There the positive match may be stored to compare it to later matches that are detected in subsequent transmissions to the same user or from the same sender, or as will be described below, to be used in adaptive rule making.

Figure 2:
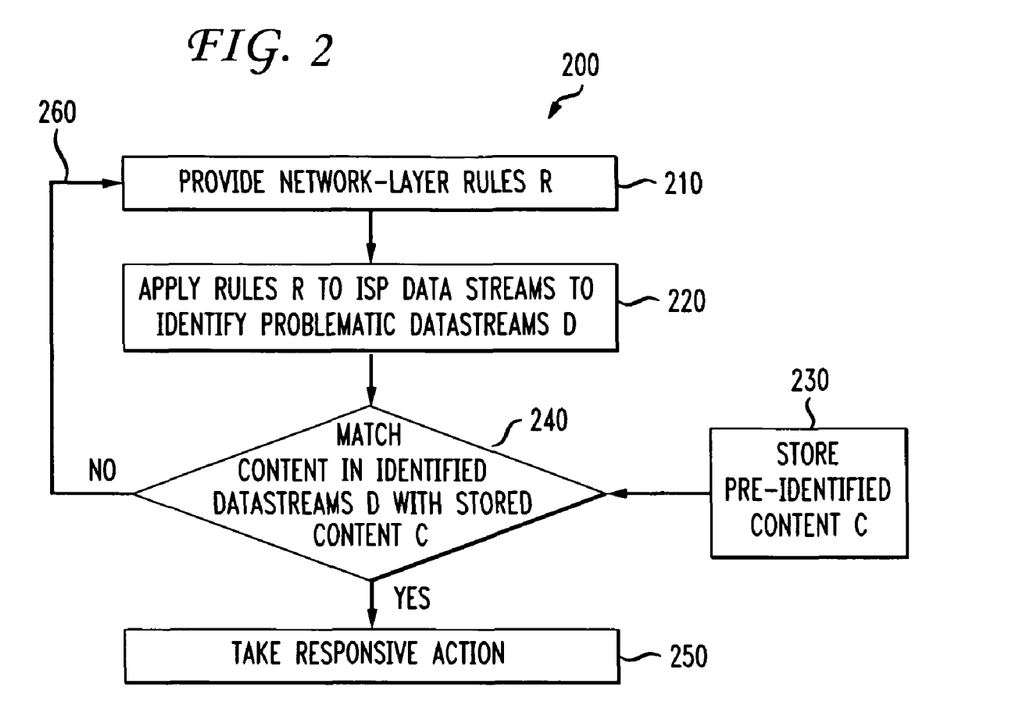
FIG. 2 is a schematic diagram of a method according to the invention.

The content detection system 100 illustrated in FIG. 1 and described above performs a content detection method 200, shown schematically in FIG. 2. In step 210, one or more profile rules R for identifying likely preidentified problematic content or repeat users of problematic content are provided, as in rule-providing device 120. In step 220, the profile rules are applied to the ISP data streams in a real-time application, as in rule-comparing device 130, to identify any data streams D which respond to the rules R and thus may be considered likely to contain preidentified problematic content. In step 230, preidentified content C such as fingerprints and/or computed hash values of copyrighted content is stored, as in database 140D in content-matching device 140. The storage step is an offline process dependent on device 140 and may be one in which content owners send the content to the ISP for storage, or one in which content owners may self-download content to database 140D. In step 240, content in the identified data streams D is matched with the stored content C, as in content-matching device 140 through the operation of processor 140P. If there is a positive match, shown by branch Y, then in step 250 a responsive action may be taken. The responsive step may include terminating the transmission, or suspending the customer's account, or reporting via the existence of the match to an interested party, such as a copyright owner or a law enforcement or security official. Preferably, the result of the matching step 240 is also delivered via a return loop 260 to the rule-providing step 210 for use in adaptively modifying the profile rules, as in rule-providing device 120, and improving their effectiveness in efficiently identifying data streams likely to have problematic content.

Rule-providing device 120 and rule-comparing device 130 preferably make use of a Data Stream Management System (DSMS) which monitors the transmitted data and evaluates streaming queries, which are usually expressed in a high-level language with SQL-like syntax. Streaming queries usually constitute an infrequently changed set of queries that run over a period of time, processing new tuple arrivals on-the-fly and periodically computing up-to-date results over recently arrived data. An example of such a data stream is the stream of packets transmitted in a Gigabit Ethernet communications network.

An example of a DSMS is the AT&T Gigascope data analyzer, whose operation is described for example, in U.S. Pat. No. 7,165,100 and in C. Cranor, T. Johnson, O. Spatscheck, and V. Shkapenyuk. Gigascope: *High Performance Network Monitoring With An SQL Interface*, in Proc. ACM SIGMOD Int. Conf. on Management of Data, pages 647-651, 2003. The Gigascope analyzer has the capability to look at every packet in a data stream and to provide answers to various queries, such as the amount of traffic of a specified data type that is transmitted from an identified origin to an identified destination. The Gigascope analyzer divides the query plan into a low-level component and a high-level component, denoted LFTA and HFTA, respectively. An LFTA query evaluates fast operators over the raw stream, such as projection, simple selection, and partial group-by-aggregation using a fixed-size hash table. Early filtering and pre-aggregation by the LFTAs are crucial in reducing the data volume fed to the HFTAs, which execute complex operators (e.g., expensive predicates, user-defined functions, and joins) and complete the aggregation. The Gigascope DSMS features a high-level query language with SQL-like syntax. Supported operators include projection, selection, aggregation, grouping, stream-merge, stream-join, and user-defined functions. The input and output of each operator (and each query) is a stream, which enables query composition and simplifies the semantics. The Gigascope analyzer provides a set of schemas corresponding to well-known protocols, protocol layers, and applications (e.g., Netflow® records, raw packets, layer-2-Ethernet, IP, TCP, UDP). This allows users to reference protocol-specific or application-specific fields in their queries without manually specifying how to extract them from the data packets. Since streams are unbounded, a blocking operator such as aggregation would never produce any output. Aggregation may be unblocked by defining windows over the stream by way of a temporal group-by attribute.

The DSMS is shown in FIG. 1 as including a processor 120P and a database 120D. The processor 120P receives all of the data being transmitted over the fiber tap 110 from link 70L to the data analyzer 120. Processor 120P also receives the signal Sm from content-comparing device 140 and has software program control of processor 120P to review how well the rules correlate with results and to adaptively modify profile rules R to improve their capability for efficiently identifying content that has a predetermined probability or likelihood of correlating with one or more types of preidentified problematic content. It will be appreciated that different profile rules R will correlate with different content. Among the criteria to be considered in the adaptive rule making are:

(a) The ability of the rules to be applied in a real-time process on the vast quantities of high-speed data carried by an ISP, which suggests that simple counting or timing rules be used to minimize processor requirements.

(b) The effectiveness of the rules in identifying the preidentified problematic content, which suggests that more complicated rules, or a larger set of rules, be used to improve correlations.

(c) The nature of the content whose presence is to be detected, which suggests that different stored content C may respond to different kinds of rules.

(d) The sensitivity of customer data, which suggests that the use of adaptive rules based on high-order network statistics as opposed to inspection of specific application-layer data to preserve customer privacy.

Resolving the criteria identified above to produce a workable set of profile rules is possible by application of known adaptive processes. Adaptive rule making methods are well known for identifying certain kinds of network traffic data patterns and for correlating them with specific events. For example, methods for detecting anomalous data stream patterns correlating with network failure are described in M. Thottan and C. Ji, *Anomaly Detection in IP Networks*, IEEE Transactions on Signal Processing, Vol. 51, No. 8, pp. 2191-2203, August 2003; L. Lewis and G. Dreo, *Extending trouble ticket systems to fault diagnosis*, IEEE Network, vol. 7, pp. 44-51, November 1993; A. Lakhina, M. Crovella and C. Diot, *Characterization of Network-Wide Anomalies in Traffic Flows*, IMC '04, Oct. 25-27, 2004, Taormina, Sicily, Italy; and A. Lakhina, M. Crovella and C. Diot, *Diagnosing Network-Wide Traffic Anomalies*, SIGCOMM '04, Aug. 30-Sep. 3, 2004, Portland, Oreg., USA. These methods, incorporated herein by reference, may be readily adapted to perform the steps of adaptive rule making method 300 shown in FIG. 3. Using such techniques, rules are provided by collecting data regarding the traffic flows within the ISP broadband network using a device such as the Gigascope data analyzer to process the collected data in conjunction with other source data from related research suggesting profile characteristics.

Figure 3:
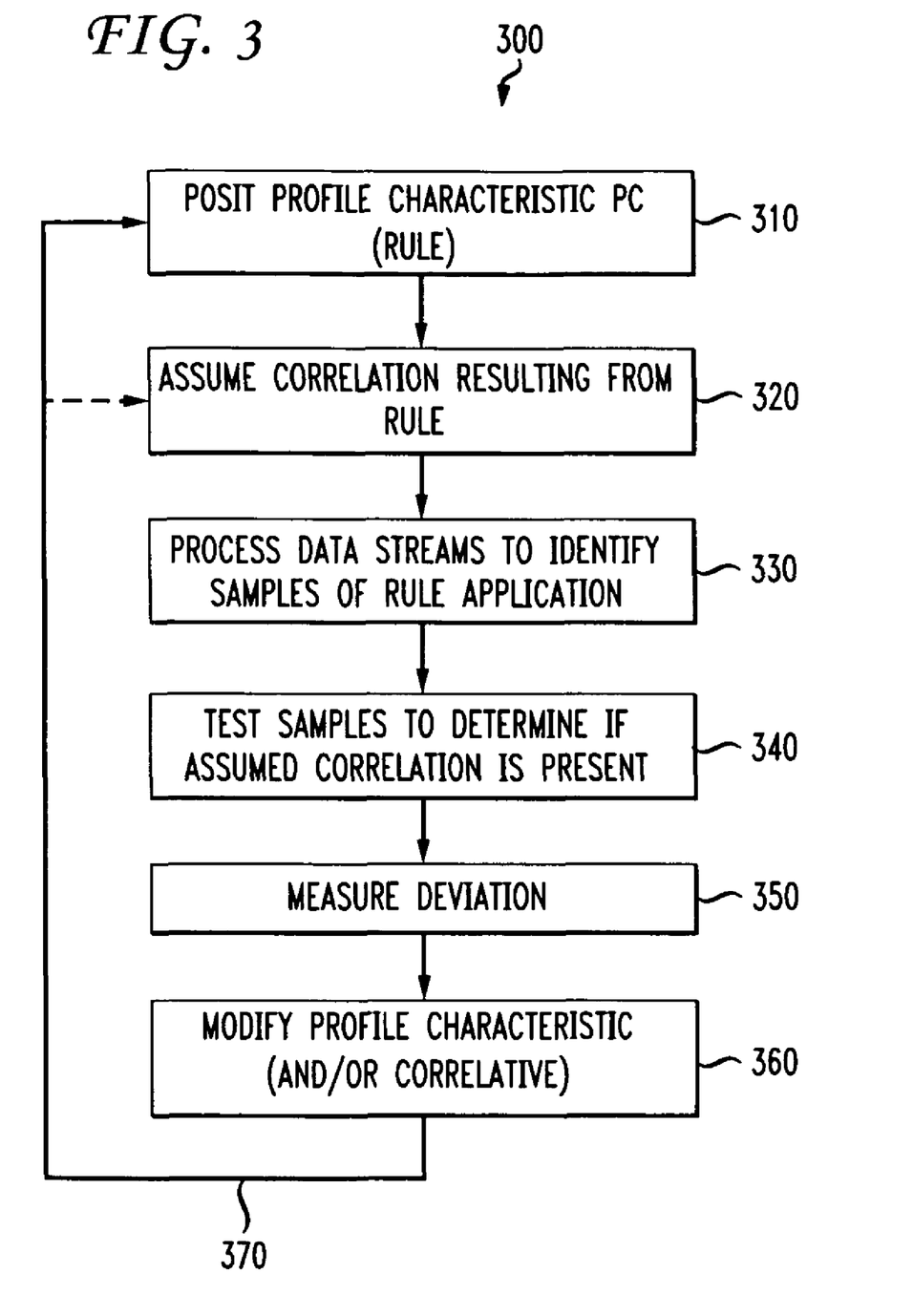
FIG. 3 is a schematic diagram of a method for creating a heuristic or profile of data streams carrying illicit content over the network.

As shown in FIG. 3, method 300 proceeds in step 310 by positing an initial profile characteristic PC in the form of a network statistic test, rule or heuristic that can be performed on a data stream, e.g., "single user+download time>1 hour+ any file type" and in step 320 by assuming a resulting correlation to the data characteristic, e.g., "corresponds to potential copyrighted movie infringement". The initial profile characteristic may be obtained from one or more studies which have suggested possible characteristics of infringing transmissions.

In step 330 the method 300 processes data streams to identify instances of the posited profile characteristic, as in rule-comparing device 130. In step 340 the identified data streams are tested, as in content-comparing device 140, to determine if the identified data streams have the assumed resulting correlation, i.e., are movie infringements. In step 350, the method proceeds by measuring a deviation based on a sample of such determinations, i.e., the difference between the measured results of a sample of tests and a desired result. For example, step 340 may determine that 30% of the rule-identified data streams correlate to infringements, and it is desired that 90% of identified data streams correlate to infringements (perhaps to avoid having too narrow a test that would fail to detect some infringements), in which example step 350 would provide a deviation of 60%.

In step 360, the method proceeds by modifying the profile characteristic (and perhaps the resulting statement of correlation to data as well) in an effort to reduce the deviation and improve the ability of the profile characteristic to predict a match. The modified profile characteristic is looped back through return path 370 to step 310 (and 320 if a change to the correlative is made) to repeat steps 330 and 340 to determine if the modified profile characteristic produces a sample that reduces the deviation measured in step 350. The construction and control of such iterative loops to produce convergent solutions are well known to those skilled in adaptive rule making. The use of method 300 permits profile characteristics to be improved based on actual network content, and to permit them to change as network usage changes (e.g., as copyright infringers change tactics). As an illustrative example, it might be found as a result of method 300 that movie infringement more closely correlates to a profile characteristic or detection rule as follows: "download times>30 minutes+a single site+ file types associated with movies (e.g., mpeg files)".

For ease of explanation, FIG. 1 shows content detection system 100 and its rule-providing device 120, rule-comparing device 130 and content-comparing device 140 as separate from network 10 and router elements 80R. Alternatively, and preferably, the various components of content detection system 100 may be incorporated into the network 10 in order to achieve cost and performance advantages. Thus, in actual network operation the mirrored router 130R will be unnecessary, and data routers 80R will directly provide their data streams for analysis by a processor such as processor 130P to identify data streams Dp suspected of containing illicit content. Similarly, processors 120P, 130P and 140P, shown as separate, may be merged into a single processor programmed to perform the adaptive rule making functions of rule-providing device 120, the data stream identification functions of rule-comparing device 130 and the content matching functions of content-comparing device 140. Such processors 120, 130 and 140 may be integrated into routers 80R, for example as part of the event monitoring service within the Element Management System (EMS) of a network element. A single DSMS, such as a Gigascope data analyzer, could be used both for adaptive rule making in device 120 and method 300 and for rule-comparing with real-time data streams in device 130, feeding identified data streams Dp to a commercially available content-comparing device 140, which can then provide a responsive signal if a match is found to be subsequently used to terminate the transmission or take other responsive steps. Such an integrated content detection system, it is expected, will identify data streams Dp with probable illicit content and then test them for a match with protected content in less than a second.

Figure 4:
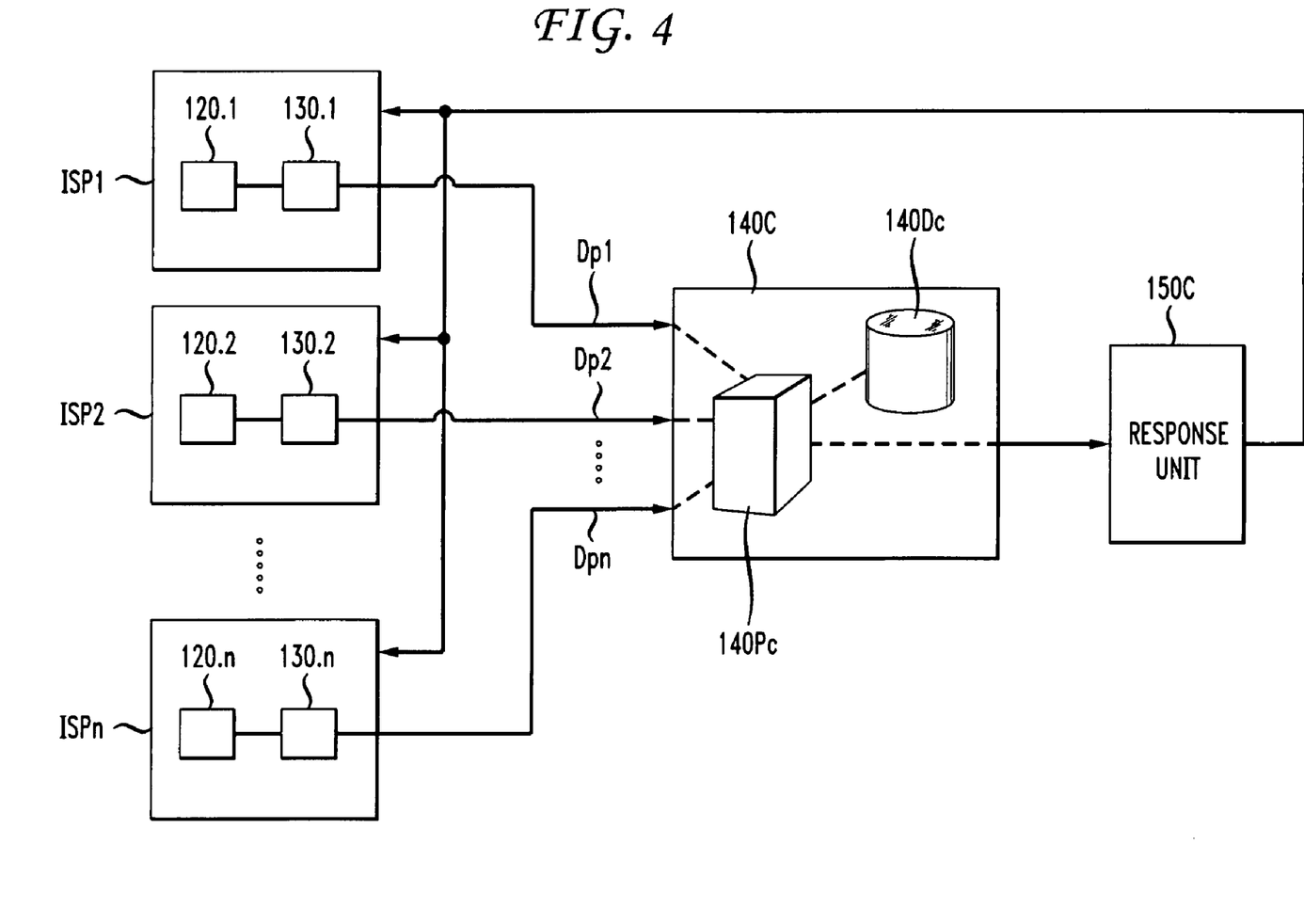
FIG. 4 is a diagram showing an example of the invention in a form shared by a plurality of ISPs.

FIG. 4 illustrates a system 400 in which several ISPs, shown as ISP1, ISP2 and ISPn, share a common content-comparing device 140C with a common repository or digital library in database 140Dc of preidentified content, e.g., copyrighted material, whose presence on ISP transmissions is sought to be detected, and a processor 140Pc to determine if identified data streams are a match with content in the database 140Dc. As shown in FIG. 4, each ISP has its own rule-providing device 120.1, 120.2, 120.n and rule-comparing device 130.1, 130.2, 130.n. The separate ISPs send identified data streams Dp1, Dp2, Dpn to the common content-comparing device 140C, which then determines, e.g., by digital fingerprinting methods, if any of the identified streams matches content in database 140Dc. System 400 permits content owners to register their material just once, in common repository or digital library 140Dc, for access by multiple ISPs and broad protection. The common content-comparing device 140C may be provided, as shown in FIG. 4, with a response unit 150C that alerts the participating ISPs that a match has been found and that appropriate responsive action, as previously discussed, may be taken.

Thus, the invention describes a method and system enabling the transmission of preidentified content, such as copyrighted material, to be detected. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

We claim:

1. A method for operating network management apparatus to detect whether one or more items of preidentified content are present in a network traffic flow being transmitted over an Internet Service Provider (ISP) network, the network traffic flow including data traffic flows potentially carrying the preidentified content intermixed together with data traffic flows carrying other content that is to remain private, all the data in the network data traffic flows being in the form of packets having both a layer with content-free network traffic information and a layer with content information, comprising:

provide the network management apparatus with access to the network traffic flow being transmitted over the ISP network;

providing the network management apparatus with one or more profile identification rules based solely on packet network layer traffic information to identify one or more data traffic flows that correlate with the preidentified content;

applying the one or more profile identification rules to the network traffic flow as it is being transmitted over the ISP network to select for further analysis those data traffic flows in the network traffic flow that have network layer information that satisfies one or more of the network layer profile identification rules;

storing in a database apparatus the one or more items of preidentified content whose presence in the network traffic flow being transmitted over the ISP network is to be detected;

after selecting a data traffic flow satisfying the one or more network layer profile identification rules, further analyzing the selected data traffic flow by comparing the content of the selected data flow with the preidentified content stored in the database apparatus to determine if it matches an item of preidentified content in the database apparatus; and if the content of the selected data traffic flow is a match with an item of preidentified content in the database apparatus, taking an action in response, wherein providing the one or more profile identification rules to identify one or more data traffic flows that correlate with the preidentified content comprises adaptively creating the one or more profile identification rules by providing an initial set of network layer profile characteristics, processing data regarding the traffic flows within the ISP network by using the initial set of profile characteristics to determine an initial correlation with preidentified content, and adjusting the set of profile characteristics to improve their correlation with the preidentified content.

2. The method claimed in claim 1 wherein the step of processing data is performed with an online data analyzer.

3. The method claimed in claim 1 wherein the network layer profile identification rules measure network layer traffic information parameters selected from source of data, destination of data, duration of data transmission from a source, frequency of data transmission from a source, and file type of data transmitted.

4. The method claimed in claim 1 wherein applying the network layer profile identification rules to data streams being transmitted in the ISP network comprises applying the rules in an active in line deep packet inspection device embedded within an ISP network element.

5. The method claimed in claim 1 wherein storing one or more items of preidentified content in a database comprises storing characteristics of the items of preidentified content in a digital library.

6. The method claimed in claim 5 wherein the stored characteristics of the preidentified content are digital fingerprints or computed hash values of the preidentified content.

7. The method claimed in claim 6 wherein comparing the content of the selected data traffic flow with the stored preidentified content comprises comparing digital fingerprints or hash values of the content of the selected data traffic flow with the digital fingerprints or hash values of an item of preidentified content stored in the database apparatus.

8. The method claimed in claim 1 wherein taking an action comprises terminating a selected data traffic flow transmission.

9. The method claimed in claim 1 wherein taking an action comprises suspending an account of an ISP customer to whom a selected data traffic flow transmission is directed.

10. The method claimed in claim 1 wherein taking an action comprises reporting the existence of the matching data traffic flow transmission to an interested party.

11. The method claimed in claim 1 wherein the database apparatus and stored preidentified content are shared by a plurality of ISPs.

12. A network management system for detecting whether one or more items of preidentified content are present in a network traffic flow being transmitted over an Internet Service Provider (ISP) network, the network traffic flow including data traffic flows potentially carrying the preidentified content intermixed together with data traffic flows carrying other content that is to remain private, all the data in the network data traffic flows being in the form of packets having both a layer with content-free network traffic information and a layer with content information, comprising:

means providing one or more network layer profile identification rules based solely on packet network layer traffic information to identify one or more data traffic flows that correlate with the preidentified content;

means for applying the one or more network layer profile identification rules to the network traffic flow as it is being transmitted over the ISP network to select for further analysis those data traffic flows in the network traffic flow that have network layer information that satisfies one or more of the profile identification rules;

a database apparatus for storing one or more items of preidentified content whose presence in the network traffic flow being transmitted over the ISP network is to be detected;

means, after selecting a data traffic flow satisfying the one or more network layer profile identification rules, for further analyzing the selected data flow by comparing the content of the selected data flow with the preidentified content stored in the database apparatus to determine if it matches an item of preidentified content in the database apparatus; and means for taking an action in response if there is a positive match between the content of the selected data traffic flow and an item of preidentified content in the database apparatus, wherein the means providing one or more network layer profile identification rules to identify one or more data flows that correlate with the preidentified content comprises means for adaptively creating the one or more network layer profile identification rules by providing an initial set of network layer profile characteristics, processing data regarding the traffic flows within the ISP network by using the initial set of profile characteristics to determine an initial correlation with preidentified content, and adjusting the set of profile characteristics to improve their correlation with the preidentified content.

13. The system claimed in claim 12 wherein the means for processing data is an online data analyzer.

14. The system claimed in claim 12 wherein the network layer profile identification rules measure network layer information parameters selected from source of data, destination of data, duration of data transmission from a source, frequency of data transmission from a source, and file type of data transmitted.

15. The system claimed in claim 12 wherein the means for applying the network layer profile identification rules to data streams being transmitted in the ISP network comprises means performing an active in-line deep packet inspection embedded within an ISP network element.

16. The system claimed in claim 12 wherein the database apparatus storing one or more items of preidentified content stores characteristics of the items of preidentified content in a digital library.

17. The system claimed in claim 16 wherein the stored characteristics of the preidentified content are digital fingerprints or computed hash values of the preidentified content.

18. The system claimed in claim 17 wherein the means for comparing the content of the selected data traffic flow with the stored preidentified content comprises means for comparing digital fingerprints or hash values of the content of the selected data traffic flow with digital fingerprints or hash values of an item of preidentified content stored in the database apparatus.

19. The system claimed in claim 12 wherein the action taken comprises terminating identified selected data traffic flow transmission.

20. The system claimed in claim 12 wherein the action taken comprises suspending an account of an ISP customer to whom the selected data traffic flow transmission is directed.

21. The system claimed in claim 12 wherein the action taken comprises reporting the existence of the matching data traffic flow transmission to an interested party.

22. The system claimed in claim 12 wherein the database apparatus and stored preidentified content are shared by a plurality of ISPs.

* * * * *